Nov. 16, 1937.　　　　　　　E. H. ALLEN　　　　　　2,099,288
RAILROAD CAR AND TRAILER COMBINATION APPARATUS
Filed Nov. 29, 1935　　　4 Sheets-Sheet 1
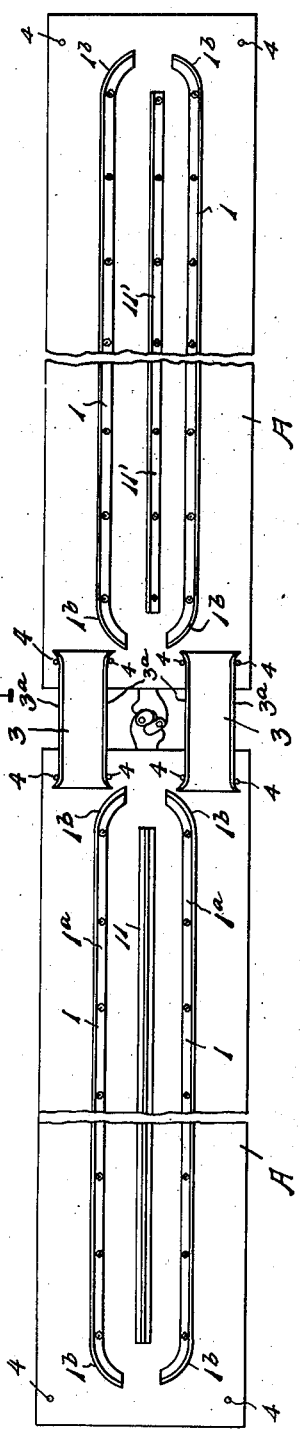
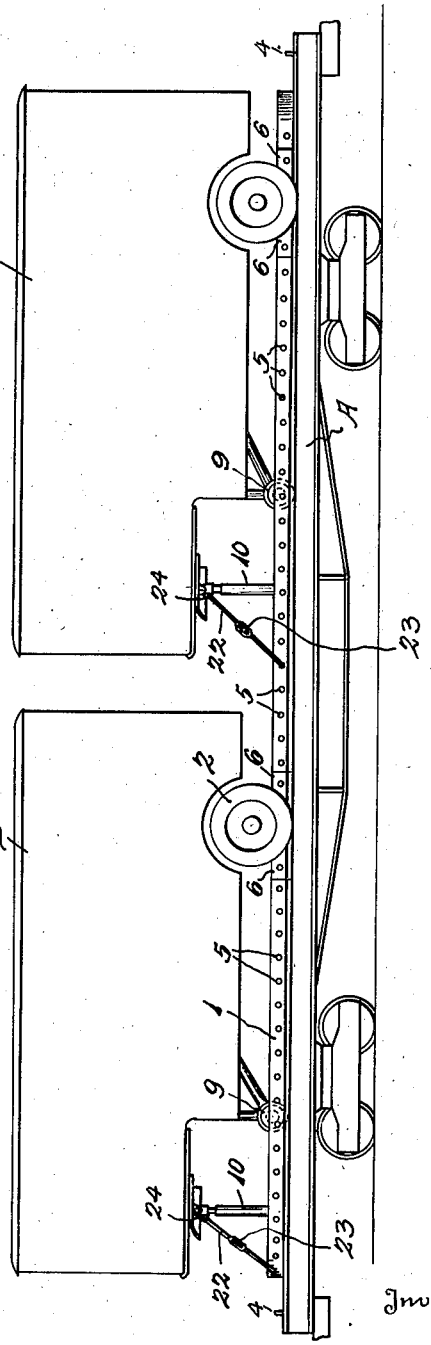
Inventor
EDWIN H. ALLEN
By Rakhad Cobb
Attorneys

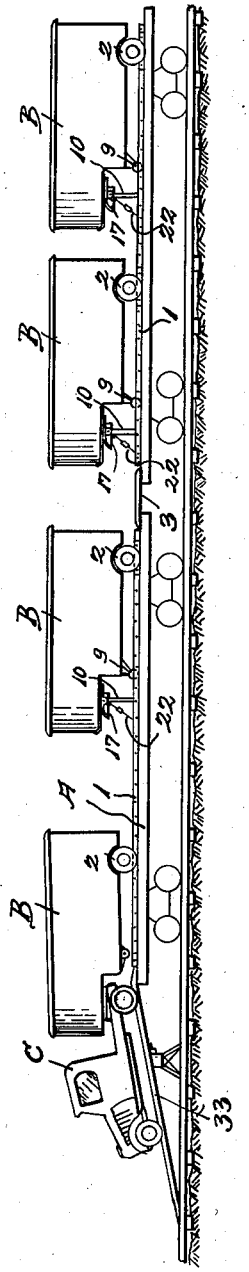

Nov. 16, 1937.  E. H. ALLEN  2,099,288
RAILROAD CAR AND TRAILER COMBINATION APPARATUS
Filed Nov. 29, 1935  4 Sheets—Sheet 3
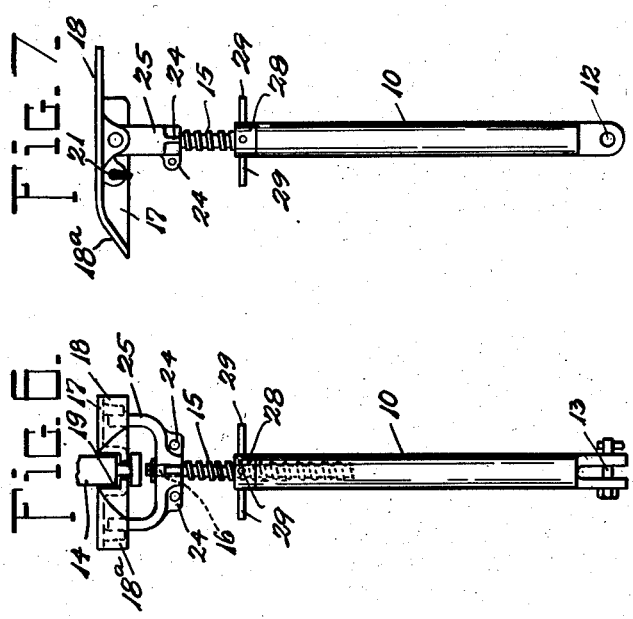
Inventor
EDWIN H. ALLEN Nov. 16, 1937.  E. H. ALLEN  2,099,288
RAILROAD CAR AND TRAILER COMBINATION APPARATUS
Filed Nov. 29, 1935  4 Sheets-Sheet 4
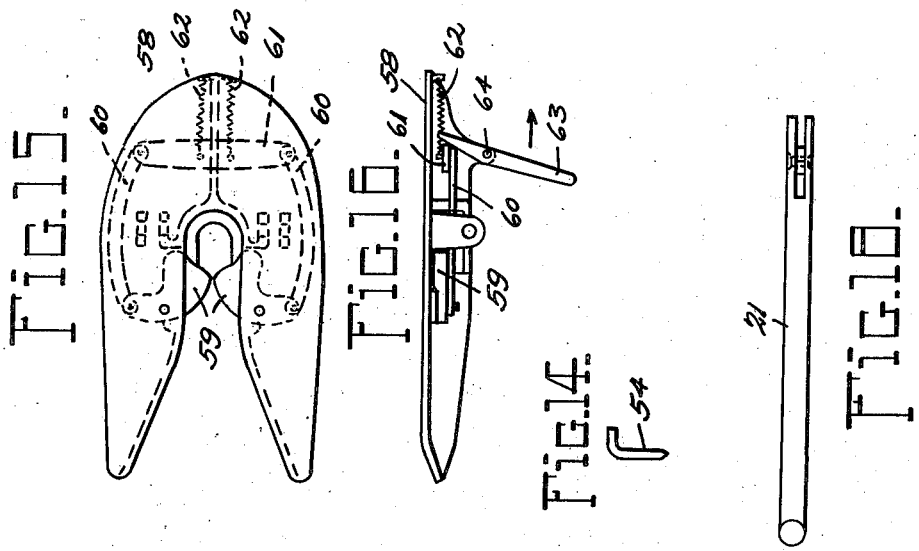
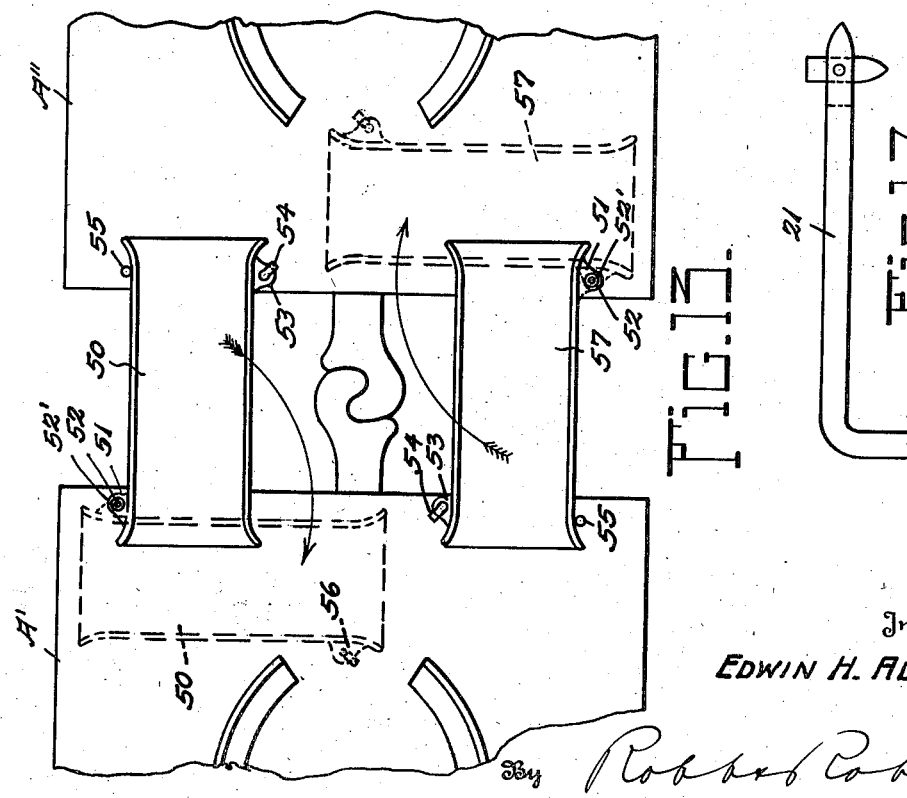
Inventor
EDWIN H. ALLEN.
By Robert Cobb
Attorneys Patented Nov. 16, 1937

2,099,288

UNITED STATES PATENT OFFICE 2,099,288

RAILROAD CAR AND TRAILER COMBINATION APPARATUS

Edwin H. Allen, Edgerton, Wis., assignor to Highway Trailer Company, Edgerton, Wis., a corporation Application November 29, 1935, Serial No. 52,268

7 Claims. (Cl. 105—368)

The present invention has to do with the transportation of merchandise or goods in what are commonly known today as trailer vehicles, and particularly with the type of these vehicles characterized as semi-trailers, because they are equipped with rear traveling wheels and coupling fifth wheels at the front ends for connecting the trailer with a tractor vehicle, usually a motor propelled pulling vehicle.

The transportation of goods in trailer vehicles enables the operator to pick up the goods at the door of the shipper and deliver the same at the door, practically speaking, of the consignee.

The present invention deals with the problem, which is becoming more and more important to shippers, of the possible use of railroad car transportation of trailers, which is particularly desirable in connection with long haul operations. It has been proposed heretofore to remove the payload bodies of trucks and trailer vehicles from the chassis and emplace these bodies upon freight cars for handling a long haul transportation. This, however, is a practice which does not satisfy the transportation problem of today because the trailer body and the trailers, of which thousands are in use, have their bodies mounted for removal and replacement, the trailer vehicle being a unit construction.

In the development of my invention, therefore, it is proposed to employ a system including special constructions of freight or flat cars for receiving the trailer vehicles thereon for long haul transportation, the equipment of the flat cars, and that utilized therewith, being such as to permit of ready running of the trailers onto the flat cars, guiding of the trailers in their movement along the cars to positions where they will be maintained fixed or stationary against unauthorized displacement, and the supporting of the front ends of the trailers in elevated positions on the cars, in the absence of the tractor vehicle which usually does this work.

Special means are utilized in conjunction with the front end fifth wheels of the trailers for locking them in suitable positions upon the flat car by which they are to be transported, after the trailers have been run onto the said cars.

Suitable car connecting runways are also availed of as part of the invention, so that the trailers may be moved from one car to another in the operation of backing a fleet of such trailers on to a train of cars.

The invention involves other details of construction and inventive features, all of which will be more fully set forth hereinafter in conjunction with the accompanying drawings, in which—

Figure 1 is a side elevation of a railroad flat car equipped with means embodying the invention for guiding the semi-trailers to positions thereon and guarding against displacement of these trailers.

Figure 2 is a top plan view of certain of the flat car equipment of the invention.

Figure 3 is a view in end elevation of one of the flat cars, omitting the coupler feature and illustrating the manner in which the trailer is positioned thereon in transit, looking toward the rear end of the trailer.

Figure 4 is a view similar to Figure 3, but illustrating the the trailer vehicle and car from the front end, bringing out more clearly the king pin engaging means which cooperates to hold the trailer against longitudinal movement.

Figure 5 is a side elevation of a plurality of flat cars showing the method of backing the trailers into proper positions thereon for fixed or stationary adjustment preliminary to transporting the trailers by means of said cars.

Figure 6 is a front elevation of the supporting and locking prop for the front end of the trailer.

Figure 7 is a side view of the prop shown in Figure 6.

Figure 8 is a top plan view of the device shown in Figures 6 and 7.

Figures 9 and 10 are fragmentary views of modified forms of the lower end of the prop means.

Figure 11 is a front view, partly broken away, of a modified form of the prop wherein two legs are provided instead of one, according to the construction of Figures 6 and 7.

Figure 12 is a perspective view of a chock pin.

Figure 13 is a top plan view of adjacent portions of two interconnected flat cars and illustrates the pivotal mounting of the runways to said cars.

Figure 14 is a detail view of a lock pin used in connection with the construction of Figure 13.

Figures 15 and 16 are detail views of a modified king pin engaging head construction, which may be advantageously used in connection with the present invention.

Figures 17 and 18 are detail views of the cross pin or bolt used in connection with the king pin engaging head of Figure 8.

The equipment used according to the present invention is comparatively simple and involves a construction of flat car as seen best in Figures 1 and 2 of the drawings, wherein the flat car A is equipped upon its upper flat surface with at least two guiding and guard members 1, these members being in the form of angles, the lower flanges 1a of which are attached by suitable fastenings to the car, and the vertical flanges of which are disposed so as to cooperate with the rear tired wheels 2 of the semi-trailer B, so that the trailer will move longitudinally of the flat car with guided effect by the cooperation of the members 1. This will ensure that the vehicles B will not become displaced laterally from the flat car as the vehicles are driven thereon by backing, as will be later explained.

At the front and rear ends thereof the guide members 1 are curved inwardly toward each other, as shown at 1b, and this feature of construction is designed to ensure that if the rear wheels of the semi-trailer are not exactly aligned with the members 1 as the vehicle is backed along the flat car A, the said wheels will be guided properly until they ride at the outer sides of the members 1. It is contemplated that one or more trailers shall be mounted upon each flat car, this being a matter which depends upon the size or length of the trailer primarily. As illustrated in the drawings, two trailers are carried by each flat car.

According to the invention, it is contemplated that the tractor vehicle as shown in Figure 5 at C shall be used to back each trailer B into position on the flat car which is to ultimately transport the same to its destination. It is notable that the flat cars A may be coupled together by any conventional coupling means, and since the operation of emplacing a fleet of trailers upon a train of flat cars necessitates that the trailers be backed along the flat cars and from one flat car to another, provision is made for this operation. Such provision involves the employment of channel bridge run-ways 3 adapted to be emplaced so as to span the space between two adjacent flat cars, the run-ways being located near the opposite sides of the flat cars and in alignment with the portions of the flat car surfaces which are adjacent to the outer sides of guide members 1.

Now the runways 3 may be constructed of rigid channel metal of U-form in cross section, and they may be removably mounted on the flat cars so that a pair of these runways may be used for any number of flat cars on a train. Or, if desired, the runways 3 might be movably connected as by pivot means at one end of each thereof, so that they may be raised and thrown back and permanently carried by one of the flat cars A when not in use for the purposes thereof. As shown in the drawings, the runways 3 are removable as previously stated, and are positioned properly by means of vertical pins or lugs 4 which interengage with the outer curves of the flared ends of the flanges 3a of said runways.

It is contemplated that after a trailer has been backed by its tractor vehicle C into proper position upon a selected freight or flat car A, means shall be provided for preventing unauthorized displacement of the trailer longitudinally while traveling upon the said car. To this end the guide members 1 are provided at intervals throughout their lengths with openings 5 formed in the vertical flanges thereof. As shown also in Figure 12, there may be used chock blocks 6 having offstanding pins 7 to interlock with the guide members 1 at the openings 5 thereof. If it be desired to prevent accidental displacement of the blocks 6 laterally of the members 1, a vertical pin 8 may be passed through the pins or projections 7 after the latter have been interengaged by passing them through the vertical flanges of the members 1. The chock blocks 6 will be used to chock the rear wheels of the semi-trailer vehicles B and will engage the tires of these wheels in a self-evident manner, according to the showing of the drawings.

But it is desirable, in addition to the use of the chocking means 6, to employ means at the front end of each trailer for locking the same to the flat car in a substantial manner, and with this in view provisions hereinafter set forth will be availed of.

It is understood that practically all semi-trailers B of the type used for purposes of the invention are equipped with the front wheel supports 9 which are of a conventional type adapted to be raised and lowered either automatically or by hand operation. Said wheel supports carry the weight of the pay-load and thus support the front end of the trailer when it is detached from its tractor vehicle C. The wheel supports 9, being rolling supports, cannot be depended upon to hold the trailer B against longitudinal movement, wherefore the additional means supplementing the action of the chocks are availed of, as will now be set forth.

Referring to Figures 6, 7, and 8 particularly, there is shown a locking device 10 which comprises the hollow body or sleeve-like body having an internal screw surface, and the lower end of which is adapted to be bolted or quick-detachably secured to a T-shaped angle plate 11 applied to the upper surface of the car A intermediate the guide members 1 thereof. The angle plates 11 include a vertical flange having openings at relatively close intervals throughout their lengths. These plates 11 provide attaching and connecting means between the car and the front portion of the trailer, which connecting means of course includes the locking device 10. Said device 10 is bifurcated at its lower end to straddle the vertical flange of the member 11 and the bifurcated portions have openings 12 therein, through which the bolts or any suitable locking fastenings 13 may pass in addition to passing through the openings in the member 11. The locking device 10 may therefore be adjusted to different points in the length of each member 11, dependent upon the position of the pay-load body or trailer B. This is necessary because the locking devices 10 are equipped with means to engage the king pins 14 at the front ends of the trailers. Moreover, the trailer bodies are of different lengths as used in ordinary commercial practice, so that the variation in the positioning of the locking devices 10 is a necessary feature of the invention on this account. Figures 6, 7, and 8 show clearly the means employed to interengage the locking device 10 with the king pin of a trailer with which it is to be associated, Figure 4 illustrating the locking device operatively disposed in relation to the trailer.

There is mounted in the upper end portion of the member 10 of the locking device a screw 15 which carries at its upper end, by means of a swivel connection 16, a king pin engaging head 17 comprising the fifth wheel engaging surface 18 and the king pin receiving socket 19. The socket 19 is open at one end of the head 17 as shown at 19a, and the sides and inner end of the socket 19 are formed with a lock flange 20 to enter the groove of the king pin 14. At its receiving end the head 17 has the surface 18 thereof downwardly curved as shown in Figure 7 at 18a, this to facilitate the interengagement of the head 17 with the king pin 14 as the locking device is swung on its pivotal axis 13 in a direction forwardly of the trailer B, for purposes of interengaging the member 17 with the king pin. After the interengagement of the parts 17 and 14 is completed, the socket 19 may be closed at its open end by means of a cross-pin or bolt 21. Or, instead of the member 21, it is contemplated that lock members of the type designated 59 such as shown in the Martin and Farr Letters Patent No. 1,412,025, may be utilized in conjunction with the operating means therefor as disclosed by said patent. Such lock members would automatically engage with the king pin as the locking device now described is shifted pivotally to cooperate with said pin, and the operating means for said operating jaws or members would be disengageable by the contrivances employed to release these parts as set forth in said Letters Patent. In other words, I do not wish to be limited in the carrying out of my invention to the employment of a means such as specifically disclosed at 21 in my drawings, because different kinds of closing devices for the socket 19 of the head 17 may be availed of.

After my locking device including the parts 10, 15, and 17, is cooperatively engaged with the king pin of a trailer, I contemplate utilizing a bracing connection between the head 17 and the car, which connection may comprise the sectional rod 22, see Figure 1, having the turnbuckle 23 in its length to adjustably connect the sections thereof. The upper section of each rod 22 may have a hook to engage in an eye or loop 24 of the standard 25 which carries the head 17, and two of the rods 22 will preferably be employed cooperating with the parts 24, ordinarily. The lower ends of the brace or guy rods 22 may have hooks to engage in selected ones of the openings 5 of the guide members 1, the said openings 5 affording adjustments similar to the openings provided at intervals throughout the length of the attachment angles or members 11 for the locking devices 10.

Figures 9 and 10 illustrate modifications in the form of the lower ends of the locking devices, and in the case of Figure 9 the locking device 10a has a pointed lower end 10b which may dig into the upper wood or other surface of the flat car. In the case of Figure 10, the construction is similar to that of Figure 9, except that the lower end of the member 10c is not only provided with the point 10b but is formed with a stop flange 10d which limits the penetrating action of the point 10b.

In Figure 11 I have illustrated a modified form of the locking device by which the use of the central attachment member or T-bar 11 may be dispensed with. In this construction the lower member of the locking device comprises the yoke-like support and connecting member 26 at the opposite lower ends of which are formed bifurcated portions 27 having openings, said bifurcated portions adapted to straddle the vertical flanges of the guide member 1 and to be bolted or otherwise quick-detachably fastened thereto. At its upper central cross portion the member 26 is equipped with the screw 15a to function similarly to the screw 15. Whereas the screw 15 is adapted to be adjusted by a turning collar 28 with rotative arms 29, the screw 15a in Figure 11 is designed to be turned by a crank 30 and handle 31 in a self-evident manner. The adjustment of the screw 15 or 15a as the case may be, is intended to permit of cooperation of the head 17 with trailers, the king pins 14 of which are at different elevations owing to the particular design of the chassis of the trailer or the size of the body thereof. Some trailers have what is known as drop frames for chassis construction, while other trailers have frames or chassis, the portions of which are all in one horizontal plane, and these different types of constructions necessitate a fairly wide range of adjustment of the heads 17 of the locking device 10.

With the modified form of the invention in Figure 11 there will be used bracing or guy rods adapted to be connected at their upper ends to eyes or loops 32 functioning similarly to the corresponding parts 22 described in reference to the construction of Figures 6 and 7.

With the foregoing features of construction of my invention in mind, it is evident that the tractor vehicle C which pulls or hauls the payload body or trailer 3 to the railroad trackage where the cars A are located, may be used to back each trailer onto the car or cars A after the manner of the showing of Figure 5. When so used, if there are a plurality of cars A, the bridge runways 3 will be utilized. When a tractor has moved the trailer B to a position such as shown in Figure 5, the rear wheels of the trailer are chocked by the chocks 6. Then the locking device 10 is positioned on the member 11 for proper cooperation with the king pin 14 of the trailer and swung upwardly and forwardly to engage the head 17 with the king pin.

The lock means 21 is then put in position to lock the head 17 to the king pin, and the guy or brace rods 22 are engaged with the parts 1 and 25, in the manner previously described, and properly adjusted or tightened. The trailer B will thus be rigidly held in place against the longitudinal displacement upon the car A, and any lateral displacement will be prevented by the parts 1. Instead of the locking device 10, the locking device of the construction of Figure 11 may be used, in which event the car A need not be equipped with the member 11. In emplacing the trailer upon the car A, the guide members 1 will of course function so that the trailer wheels will move properly along the surface of the car under guided conditions.

Figure 5 discloses that I may use a suitable ramp 33 as a proper incline up which the tractor may push the trailer in getting the same to a proper level or plane, which will be that of the upper surface of each flat car A. If desired, platforms flush with the upper surface of the rails of the trackage may be availed of in advance of the ramps 33 to make it easy for the pulling and pushing vehicles C to move the trailers B up the ramp 33 onto the cars.

The particular type of flat car A illustrated in the drawings is conventional and immaterial to the invention.

The member 11 may be of T-like configuration, as seen at the left-hand side of Figure 2, or it may be of L-shape, as indicated at 11' at the right side portion of Figure 2.

The channel bridge runways 3 which are adapted to span the space between two adjacent flat cars may be pivotally connected to the flat cars as clearly shown in Figure 13. As will be seen from this figure, the runway 50 is pivotally connected to the flat car A' by means of a flange portion 51 and bolt 52 forming a hinge 52'. A similar flange 53 is provided and arranged to permit the insertion of a lock pin 54 into said flange and flat car to hold the runway in position when in use. A stop member 55 is provided for limiting the movement of the member 50 when the same is turned into operative position.

When the flat cars are loaded, as hereinbefore described, the pin 54 is removed and the runway 50 is swung into the dotted line position and is held in such position by inserting pin 54 into the hole in the flange 53 and a corresponding hole in the flat car at 56.

In a similar manner runway 57 is pivotally secured to flat car A" and the same is swung into operative and inoperative positions in exactly the same manner as outlined above in respect to runway 50.

The king pin engaging head construction 58, as shown in Figures 15 and 16, may be used in connection with the member 10 and taking the place of the head 18. The head construction 58 comprises the jaws 59 held in interlocking position by means of members 60, 61 and springs 62. A lever 63 pivoted at 64 and engaging member 61 is provided for moving the jaws 59 into unlocking position upon movement of lever 63 in a direction indicated by an arrow in Figure 16.

It will therefore be seen that the king pin of a trailer will be automatically locked in said head structure when the same is moved into trailer supporting position. The unlocking, however, is effected by manual operation of the lever 63, as above referred to.

While the jaws 59 may be operated by means of lever 63, any other instrumentalities such as shown in the Martin and Farr patent above referred to, may be employed.

The pin engaging head 58, as seen from Figures 15 and 16, is of an elongated construction to provide a better support distribution, while the width of said head is considerably narrow to reduce the weight of the same.

Having thus described my invention, what I claim as new and desire to secure by Letters Patent of the United States, is—

1. In a system of railroad car trailer transportation means of the class described, in combination, a car, guide members on the car for cooperation with the rear end supporting wheels of a trailer to guide the movement of the trailer longitudinally of the car, chocks carried by the car and having projections to interlock with the guide members, said guide members having openings at intervals in their lengths to receive said projections, and instrumentalities for connecting the front end of the trailer with the car, said instrumentalities cooperating with said guiding members and shiftable upwardly and downwardly for cooperation with the king pin at the front end portion of a trailer.

2. In a system of railroad car trailer transportation means of the class described, in combination, a car, guide members on the car for cooperation with the rear end supporting wheels of a trailer to guide the movement of the trailer longitudinally of the car, chocks carried by the car and having projections to interlock with the guide members, said guide members having openings at intervals in their lengths to receive said projections, and a device for connecting the front end of the trailer with the car, said device cooperating with said guiding members and shiftable upwardly and downwardly for cooperation with the king pin at the front end portion of a trailer, said device being equipped with a swivelled head forming the means to coact with the king pin of a trailer and comprising fastening means to lock the head to the king pin when said device is elevated for cooperation of its head with the trailer.

3. In a system of railroad car trailer transportation means of the class described, in combination, a car, guide members on the car for cooperation with the rear supporting wheels of a trailer to guide the movement of the trailer longitudinally of the car, chocks carried by the car and having projections to interlock with the guide members, said guide members having openings at intervals in their lengths to receive said projections, and instrumentalities for connecting the front end of the trailer with the car, said instrumentalities comprising relatively adjustable members adapted to be lengthened and shortened to accommodate for connection with trailer frames of different heights from the travel surface over which the trailer may operate.

4. In a system of railroad car trailer transportation means of the class described, in combination, a car, guide members on the car for cooperation with the rear end supporting wheels of a trailer to guide the movement of the trailer longitudinally of the car, chocks carried by the car and having projections to interlock with the guide members, said guide members having openings at intervals in their lengths to receive said projections, and a device for connecting the front end of the trailer with the car, said device comprising a lower member having an internal thread, an upper member having an external thread to be screwed into the lower member, and a head on the upper member comprising locking means to connect it with the king pin of a trailer.

5. In a system of railroad car trailer transportation means of the class described, in combination, a car, guide members on the car for cooperation with the rear end supporting wheels of a trailer to guide the movement of the trailer longitudinally of the car, chocks carried by the car and having projections to interlock with the guide members, said guide members having openings at intervals in their lengths to receive said projections, a device for connecting the front end of the trailer with the car, said device comprising a lower member having an internal thread, an upper member having an external thread to be screwed into the lower member, and a head on the upper member comprising locking means to connect it with the king pin of a trailer, a swivel connection between the upper member and said head, and a bracing connection intermediate the said head and the car body for maintaining the locking device in locking relation to the trailer.

6. In a system of railroad car trailer transportation means of the class described, in combination, a car, guide members on the car for cooperation with the rear end supporting wheels of a trailer to guide the movement of the trailer longitudinally of the car, chocks carried by the car and having projections to interlock with the guide members, said guide members having openings at intervals in their lengths to receive said projections, and instrumentalities for connecting and interlocking with the car the front end of the trailer.

7. In a system of railroad car trailer transportation means of the class described, in combination, a car, guide members on the car for cooperation with the rear end supporting wheels of a trailer to guide the movement of the trailer longitudinally of the car, chocks carried by the car and having projections to interlock with the guide members, said guide members having openings at intervals in their lengths to receive said projections, and instrumentalities for connecting and interlocking with the car the front end of the trailer, said instrumentalities cooperating with said guiding members.

EDWIN H. ALLEN.